United States Patent [19]

Takahashi et al.

[11] Patent Number: 4,480,156
[45] Date of Patent: Oct. 30, 1984

[54] ECHO CANCELLER SYSTEM

[75] Inventors: Kenzo Takahashi; Takashi Sakamoto, both of Kanagawa, Japan

[73] Assignee: Nippon Telegraph & Telephone Public Corp., Tokyo, Japan

[21] Appl. No.: 319,783

[22] Filed: Nov. 9, 1981

[30] Foreign Application Priority Data

Nov. 15, 1980 [JP] Japan ............... 55-160110
Oct. 15, 1981 [JP] Japan ............... 56-164635

[51] Int. Cl.³ .................................. H04B 3/20
[52] U.S. Cl. .................................. 179/170.2
[58] Field of Search ......... 179/170.2, 170.4, 170.6, 179/170.8

[56] References Cited

U.S. PATENT DOCUMENTS 3,647,992  3/1972  Thomas ............... 179/170.2
3,922,505  11/1975 Höge ................. 179/170.2
4,162,378  7/1979  Bandoux et al. ...... 179/170.2

Primary Examiner—Gene Z. Rubinson
Assistant Examiner—James L. Dwyer
Attorney, Agent, or Firm—Burgess, Ryan & Wayne

[57] ABSTRACT

In addition to the telephone signal input and output terminals, a unit circuit is provided with novel input and output interfaces, and m echo canceller unit circuits are connected to each other in cascade with data buses in order to cancel the echoes of an m-times echo path delay.

6 Claims, 21 Drawing Figures

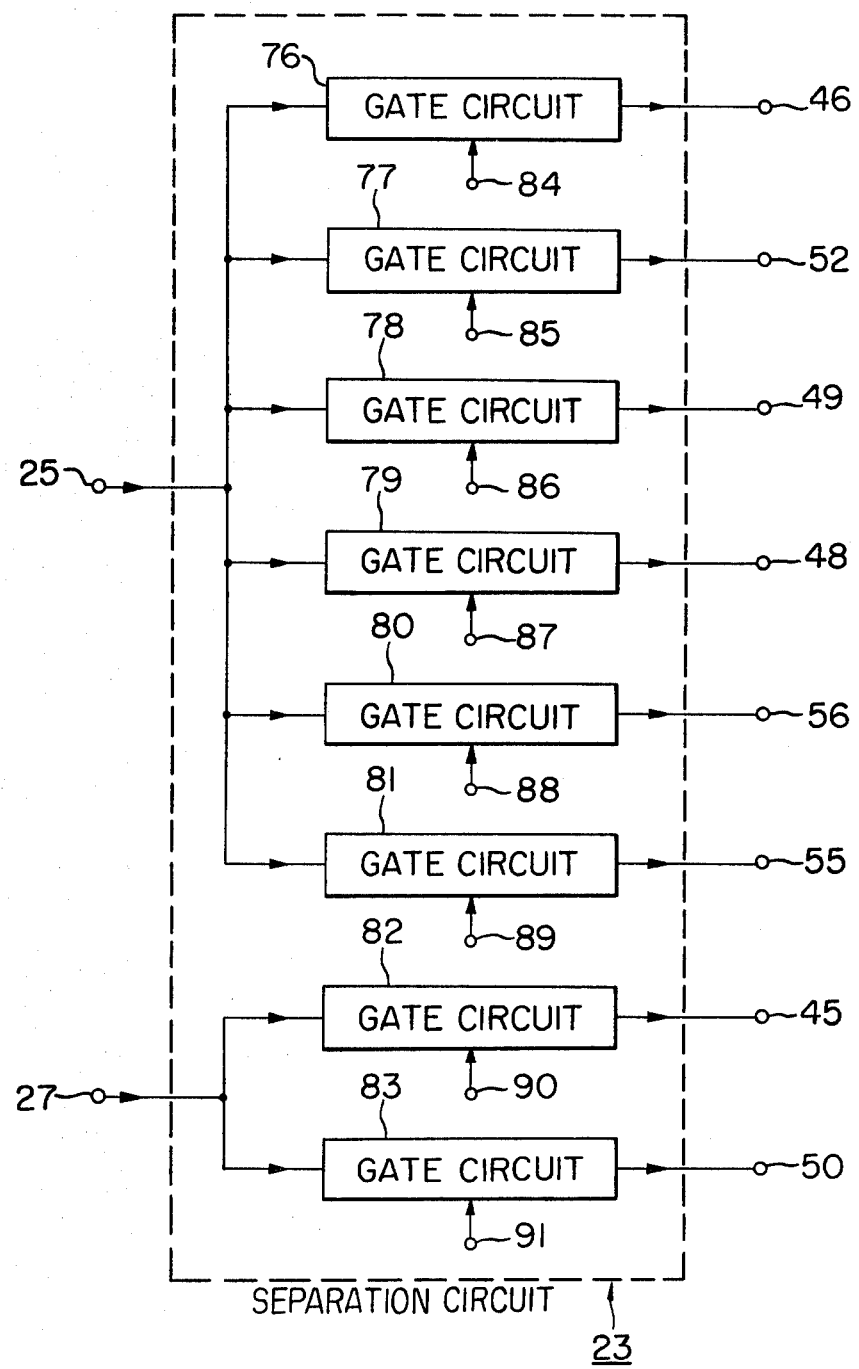

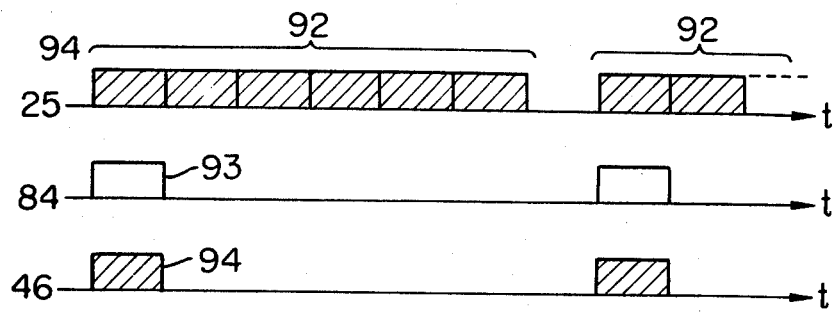
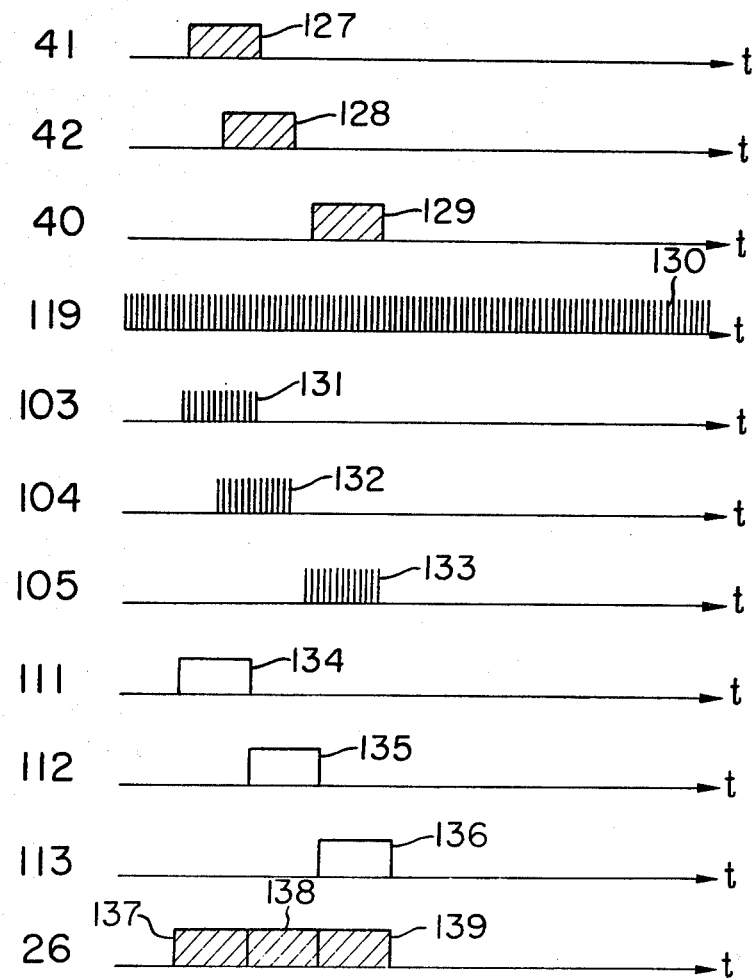

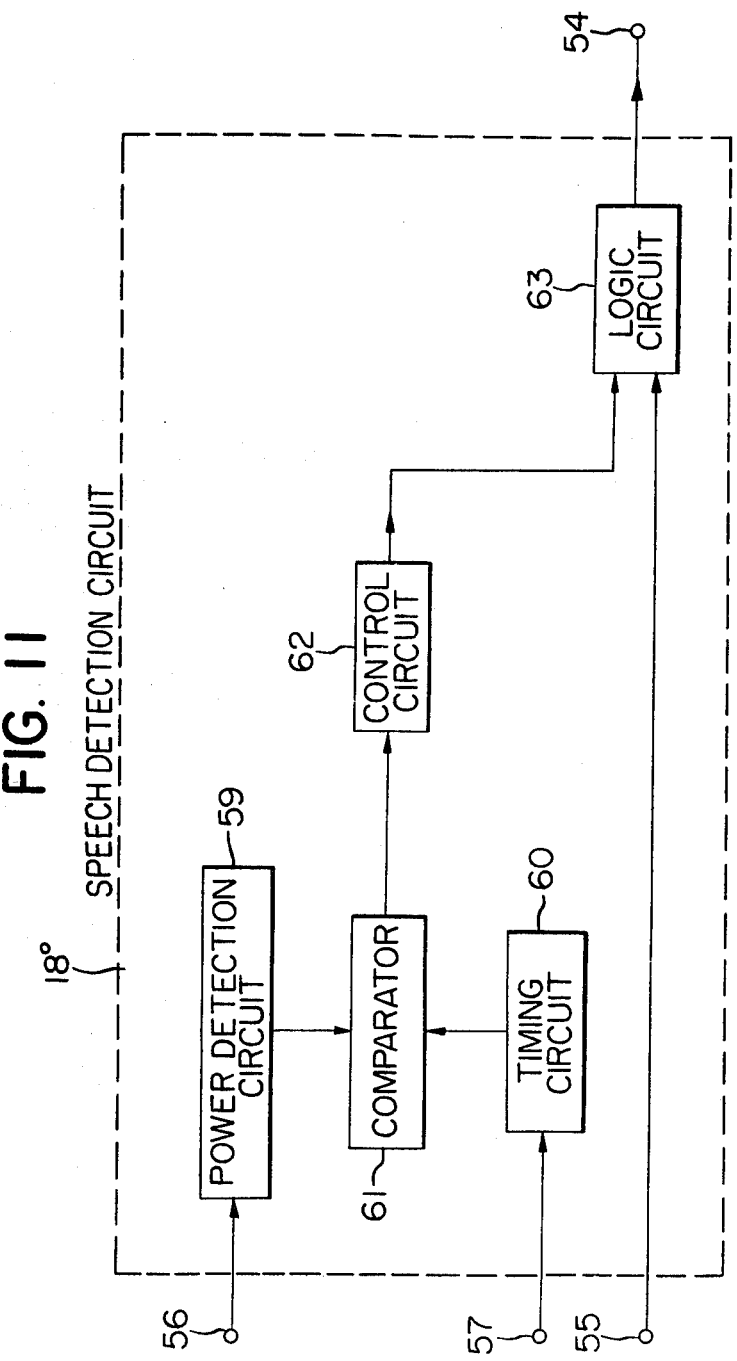

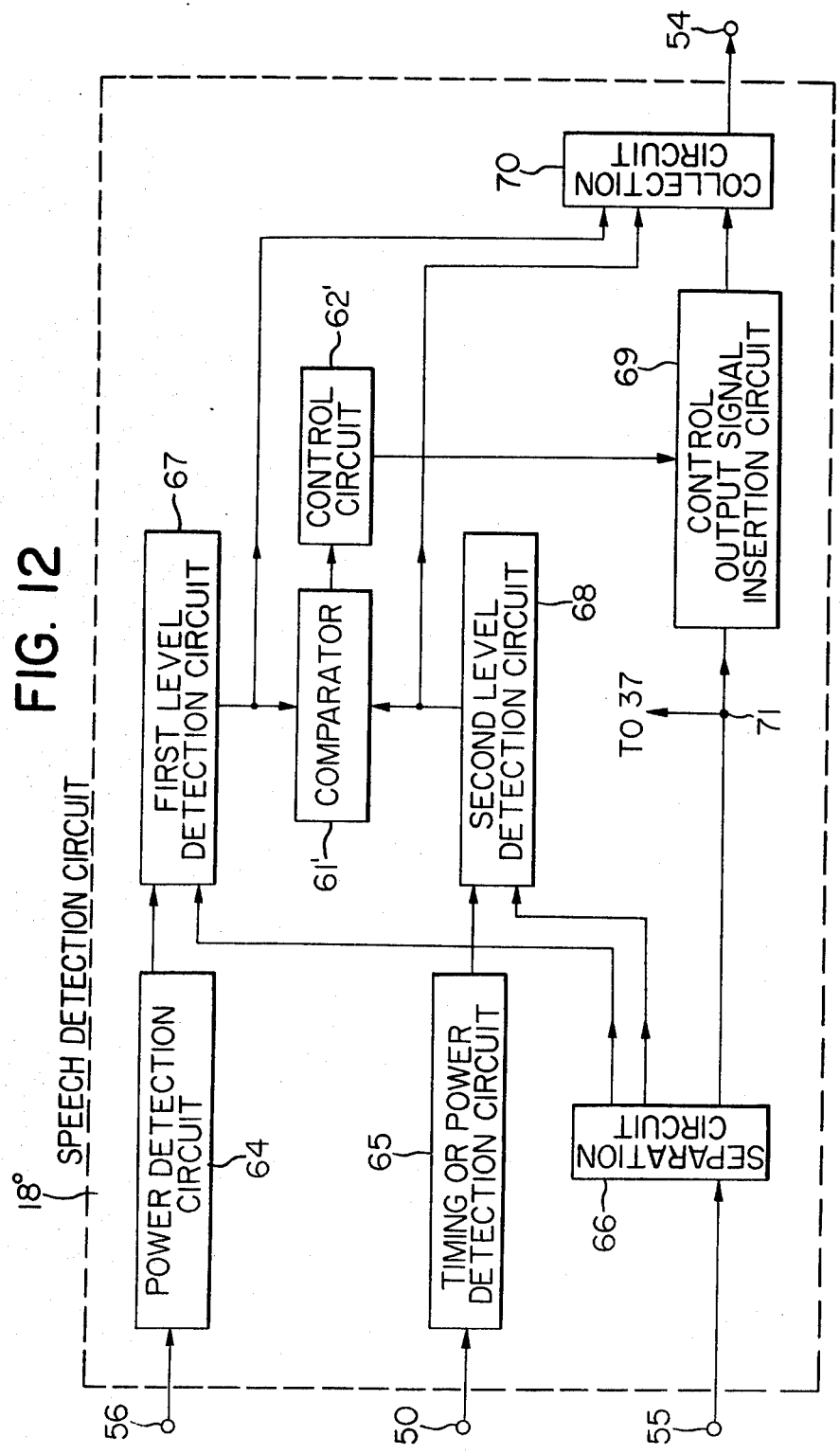

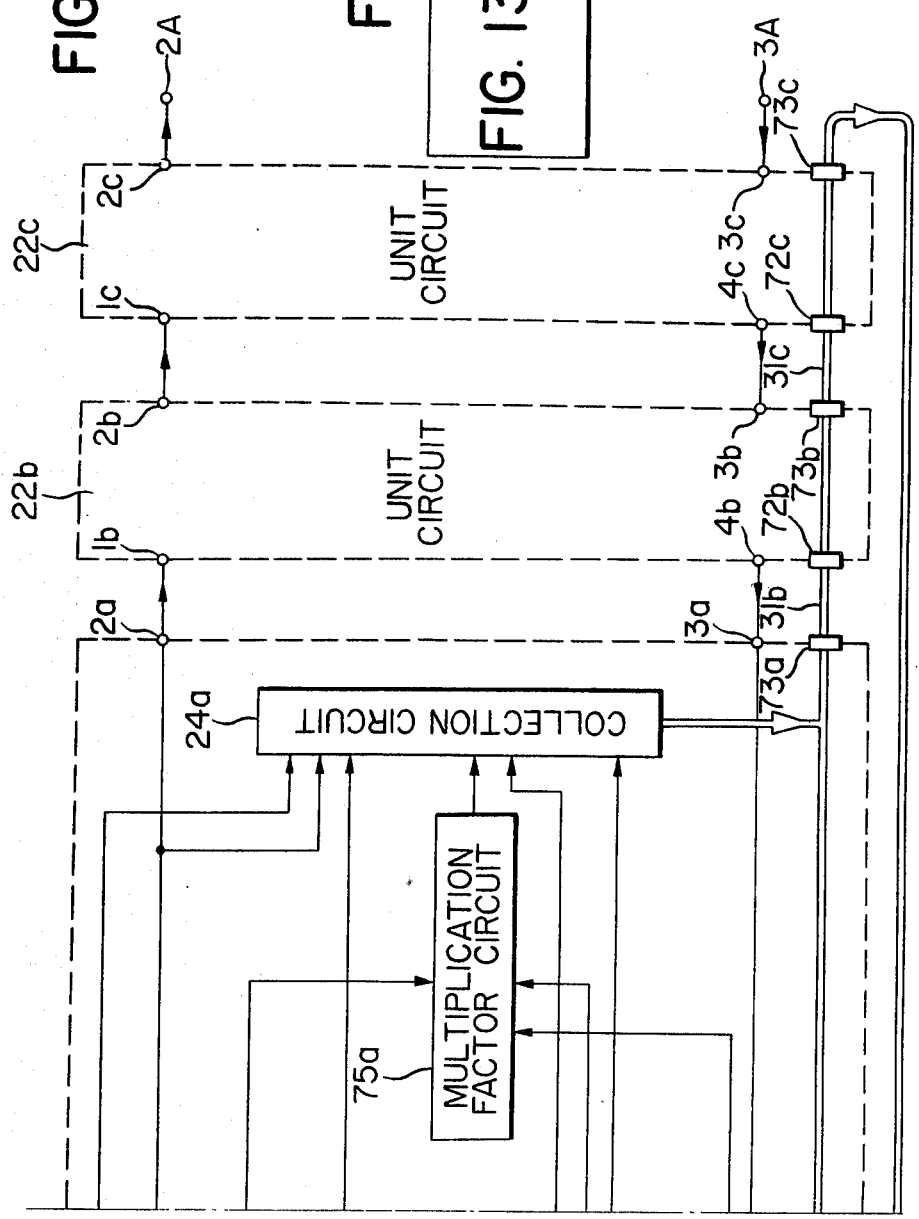

FIG. 14

| CIRCUIT \ t | | iTo ←——— To ———→ (i+1)To |
|---|---|---|
| 22a | 5a | ⊢ I&T |
| | 6a | ⊢————————————⊣ c |
| | 10a | ⊢————————————⊣ c |
| | 11a | ⊢ I — — — — — — — ⊢ c&T |
| | 36a | ⊢——————————⊣ c |
| | 37a | ⊢——————————⊣ c |
| | 75a | ⊢————⊣ c&T  ⊢c&T |
| | 18a | c&T ⊢————⊣ |
| 22b | 5b | ⊢ I&T |
| | 6b | ⊢————————————⊣ c |
| | 10b | ⊢————————————⊣ c |
| | 11b | ⊢c&T |
| | 36b | ⊢——————————⊣ c |
| | 37b | ⊢——————————⊣ c |
| | 75b | ⊢————⊣ c&T |
| | 18b | c&T ⊢————⊣ |
| 22c | 5c | ⊢ I&T |
| | 6c | ⊢————————————⊣ c |
| | 10c | ⊢————————————⊣ c |
| | 11c | ⊢ c&T |
| | 36c | ⊢——————————⊣ c |
| | 37c | ⊢——————————⊣ c |
| | 75c | ⊢————⊣ c&T |
| | 18c | c&T ⊢————⊣ |

ECHO CANCELLER SYSTEM

BACKGROUND OF THE INVENTION

1. Field of the Invention

The present invention relates to an echo canceller which cancels echoes generated in telephone circuits with the echo estimate produced from the far end talker's speech signal so that customers can be free from the subjective annoyance of echo.

2. Description of the Prior Art

As is well known in the art, in telephone circuits which involve two-wire and four-wire transmission lines interconnected through hybrid transformers, a component of the incoming far end talker's speech signal transmitted through the four-wire transmission line leaks to the send path and returns as an echo to the talker, mainly due to the mismatch between the impedance of the two-wire transmission facilities looking toward the near end customer and the impedance of the balancing network in the hybrid. Customers feel the echo annoyance more as the propagation delay through the four-wire transmission line increases, because the echo returns to the far end customer with a time lag after sending the corresponding messages.

In order to overcome this problem, Dr. Sondhi et al. at Bell Laboratories has devised an echo canceller. A transversal filter receives the incoming signal and generates an echo estimate. The echo estimate is reversed in polarity and inserted into the send path. Therefore, the near end talker's speech signal passes through the send path, but the echo returning to the far end talker is counterbalanced with the echo estimate and not transmitted back to the far end talker.

The incoming signal component is transmitted through the near end echo path, accompanied by a delay. In addition, the impedance mismatching causes the waveform dispersion on the time axis. As is well known in the art, from various literature, conventional echo cancellers are four-terminal pair networks having the input and output terminals to and from the send path and the receive path. It is impossible to improve the performance, particularly the accomodated near end delay, of an echo canceller even if such four-terminal networks might be connected in cascade or in parallel. Therefore, the number of arithmetical elements of the echo canceller, in addition to those of transversal filters and their control circuit composing the echo canceller, must cover the worst near end delay. As a result, the conventional echo cancellers are obliged to be extremely large in size, compared with the other echo control devices, for instance, echo suppressors. Therefore, they are apt to have a disadvantage in both structure and cost. Attempts have been made to improve echo cancellers by utilizing semiconductor integrated circuit techniques such as LSI, but at present it is not feasible to provide such large sized LSI echo canceller because of the integration limit. The integrated circuit echo canceller would involve an extremely large number of logic gates which cannot be implemented on one chip, from the point of view of cost, performance and reliability in operation. As an example, in International Telegraph and Telephone Consultative Committee (CCITT) most of delay rates refer to the 40 millisecond (ms) echo path delay which is the sum of the abovedescribed transmission delay and the waveform dispersion time span in each country. If the total delay provided by a tapped delay circuit which makes up a transversal filter, is less than 40 ms to reduce the number of elements, it would be impossible to prevent the return of echo to the remote customers farther than 40 millisecond in end delay from the terminal station equipped with the echo canceller. On the contrary, the an LSI system which could cancel echoes with an longer end delay than 40 ms would require about 40 kilo gate arithmetical elements which is estimated to be too large to provide an LSI echo canceller chip at present.

OBJECT OF THE INVENTION

One of the objects of the present invention is, therefore, to provide an echo canceller unit circuit which is comparatively small in structure, operates at a low processing speed and wherein the appropriate number of identical unit circuits can be connected to each other in cascade to provide a desired echo path delay.

Another object of the present invention is to provide a novel echo canceller composed of the above-mentioned identical unit circuits which are connected in cascade to operate as one large scale echo canceller covering the possible echo path delay range.

SUMMARY OF THE INVENTION

Briefly stated, the present invention provides echo canceller unit circuits each of which, in addition to the input and output terminals to and from the send and receive pathes, are provided with output means for deriving desired data from component parts of each unit circuit and input means for delivering such data to the component parts.

According to one aspect of the present invention, the output and input means are in the form of output and input terminals. According to another aspect of the present invention, they are collection and separation circuits which, in a time-division manner or in a time- and space-division manner, collect and separate desired data.

In an echo canceller in accordance with the present invention, a plurality of the above-mentioned echo canceller unit circuits are connected in cascade and their input and output means are interconnected with data buses.

More specifically, according to the present invention, a plurality of echo canceller unit circuits are connected in cascade, the number of unit circuits being dependent upon a required maximum echo path delay. The output from the collection circuit in every stage is delivered to one data bus while the input to the separation circuit in every stage is applied from the data bus. The data bus is interconnected between the first and last stage unit circuits, whereby a feedback loop can be established. Thus, the certain number of cascade-connected unit circuits can operate, as a whole, in a manner substantially similar to an echo canceller in which the same number of the tapped delay circuits are connected and processed in series.

BRIEF DESCRIPTION OF THE DRAWINGS

FIG. 7 is a diagram of a data separation circuit;

FIG. 8 is a view used to explain the mode of operation thereof;

FIG. 10 is a view used to explain the mode of operation thereof;

FIG. 11 is a block diagram of speech detection circuit available for distinguishing the near end talker's speech;

FIG. 12 is a block diagram of another signal from the send path incoming signal speech detection circuit;

FIGS. 13, 13a and 13b are block diagrams of a second embodiment of the present invention;

FIG. 14 is a timing chart used to explain the various operations executed in each unit circuit;

DESCRIPTION OF THE PREFERRED EMBODIMENTS

Figure 1:
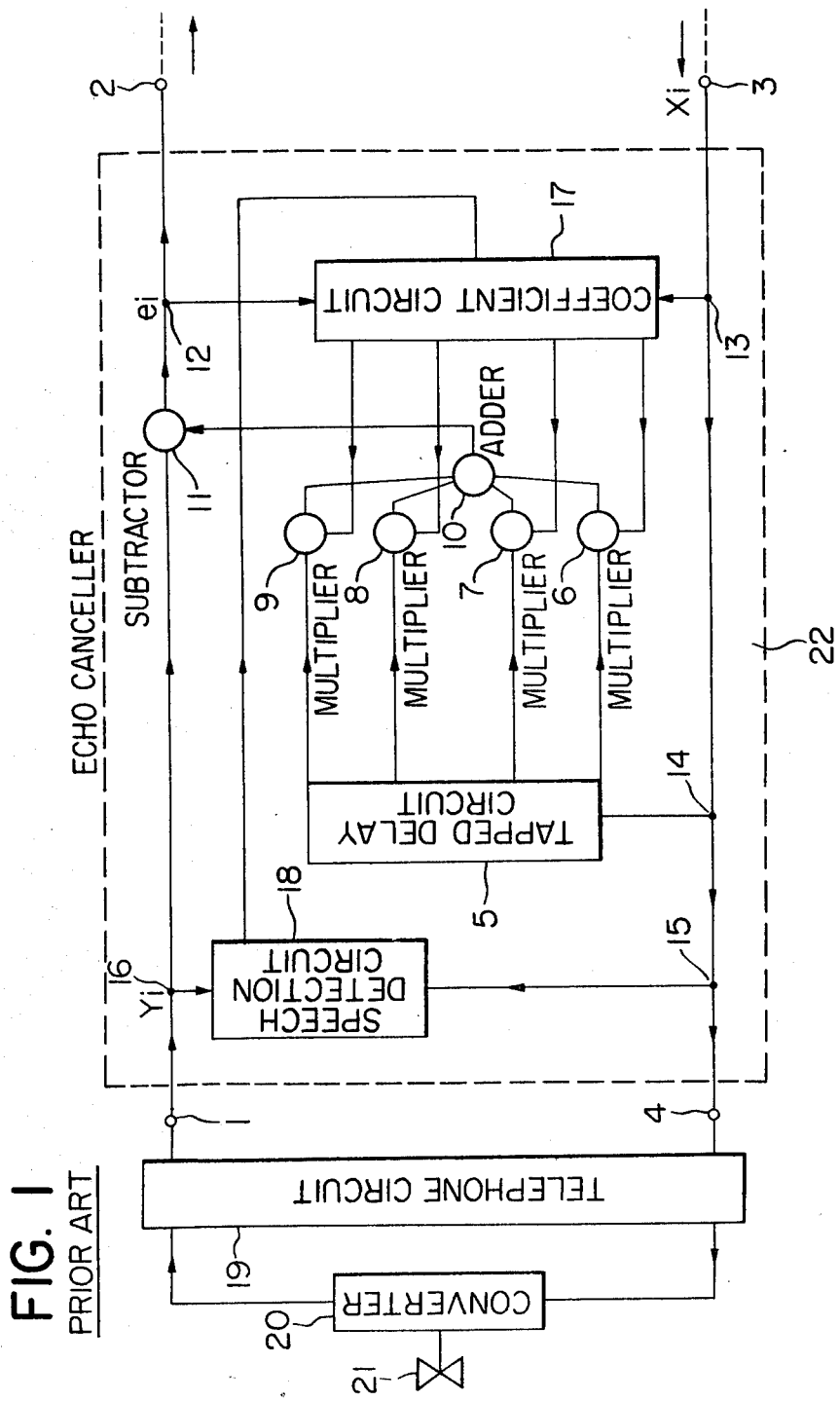
FIG. 1 is a block diagram of a prior art echo canceller.

Prior Art, FIG. 1

Prior to the description of the preferred embodiments of the present invention, a prior art echo canceller is briefly described with reference to FIG. 1 for a better understanding of the present invention.

In FIG. 1, reference numeral 1 designates an input terminal of a send path; 2, an output terminal of the send path; 3, an input terminal of a receive path; 4, an output terminal of the receive path; 5, a tapped delay circuit; and 6, 7, 8 and 9, multipliers for weighting the outputs through each tap from the first to (n+1)-th taps.

Reference numeral 10 denotes an adder; 11, a subtractor; 12, 13, 14, 15 and 16, branch points; 17, a coefficient circuit which receives the inputs derived from the branch points 12 and 13 and estimates every optimum tap coefficient which is applied to the multipliers 6, 7, 8 and 9 so that the level of echo cancellation error which appears at the branch point 12 can be minimized; 18 is a speech detection circuit which compares both levels of the input signal transmitted on the receive path and derived at the branch point 15 and the input signal transmitted on the send path and derived at the branch point 16 so as to detect whether the near end customer is speaking or not; that is, whether or not the near end talker's speech signal exists.

If the near end talker's speech signal exists, the speech detection circuit 18 controls the coefficient circuit 17 in such a way that the circuit 17 stops temporarily its automatic coefficient adjustment operation which has been being carried out in order to provide and store optimum tap coefficients. Thereafter, the speech detection circuit 18 forces the coefficient circuit 17 to give the newest coefficients to be applied to the multipliers 6-9. In addition, if the speech detection circuit 18 detects that the near end talker's speech signal drops in level and the echo from the far end talker is dominant, it so controls the coefficient circuit 17 as to resume its coefficient correction operation. Reference numeral 19 represents a terrestrial four-wire telephone circuit connected to the echo canceller; 20, a two wire-to-four wire converter; 21, a telephone set for a near end customer; and 22, an echo canceller.

When the near end customer talks into the telephone set 21, the speech signal is transmitted through the two-to-four wire converter 20, the telephone circuit 19, the input terminal 1 to the send path, the branch point 16, the subtractor 11, the output terminal 2 and a long propagation delay circuit such as a satellite communication circuit, to the far end customer's telephone set which is in point symmetrical relationship with the circuitry as shown in FIG. 1. The speech signal from the far end customer reaches the input terminal 3 and transmitted through the branch points 13, 14 and 15, the output terminal 4, the telephone circuit 19 and the converter 20 to the telephone set 21. In this case, a component of the receive signal is transferred through the converter 20 to the send path toward the far end customer, thus causing the echo.

The receive signal branched at the branch point 14 passes through a transversal filter consisting of the tapped delay circuit 5, the multipliers 6–9 and the adder 10 so that the echo estimate which is similar to the echo applied to the input terminal 1 is generated from the adder 10. The subtractor 11 makes the polarity of the echo estimate so as to be opposite to that of the echo coming from the input terminal 1 so that they are cancelled out by each other. As a consequence, only the speech signal from the near end customer can be transmitted to the far end customer.

The optimum tap coefficients applied to the multipliers 6–9 are sampled values of the impulse response obtained through the echo path extending from the output terminal 4 through the telephone circuit 19 and the converter 20 to the input terminal 1 of the send path. If each tap coefficient is not optimized, the approximation error between the echo and the echo estimate increases so that the echo cancellation error appears at the branch point 12. The coefficient circuit 17 sequentially determines the tap coefficients that the echo cancellation error can be minimized and subsequently it is gradually diminished.

The closed loop 11-12-17-10-11 forms a negative feedback loop. If the speech signal from the telephone set 21 is inserted into the send path, both the echo cancellation error and the speech signal are applied through the branch point 12 into the coefficient circuit 17 so that the tap coefficients tend to deviate from their optimum values. However, in practice, the speech detection circuit 18 disconnects the negative feedback loop including the coefficient circuit 17 immediately after the speech signal from the near end customer has been detected so that the tap coefficients are maintained at those values obtained immediately before the speech signal appears and consequently the tap coefficients are not disturbed.

The circuit as shown in FIG. 1 is closed so that when a plurality of such circuits are cascade connected, they operate independently of each other. As a result, they cannot constitute one echo canceller.

Figure 2:
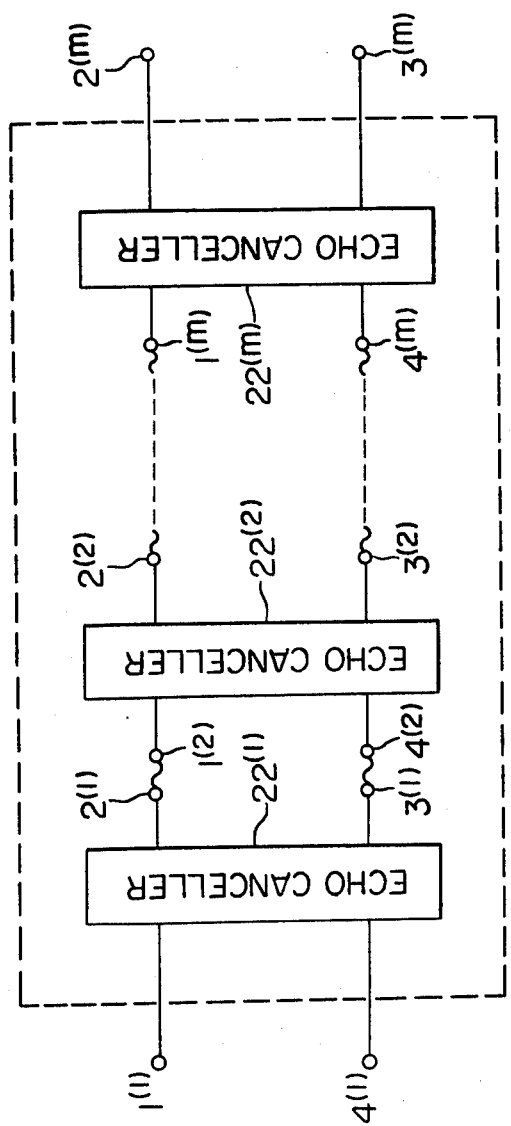
FIG. 2 shows a system in which such m echo cancellers of the type as shown in FIG. 1 are connected in cascade.

FIG. 2 shows a circuit consisting of a plurality of circuits as shown in FIG. 1 which are connected in cascade, $1^{(1)}$-$1^{(m)}$; $2^{(1)}$-$2^{(m)}$; $3^{(1)}$-$3^{(m)}$; and $4^{(1)}$-$4^{(m)}$ correspond to the terminals 1–4, respectively. The echo path delay which the circuit as shown in FIG. 2 can accommodate is not more than the delay which can be provided by the tapped delay circuits in respective stages. Therefore, a delay of m times cannot be accommodated.

The Invention

Figure 3:
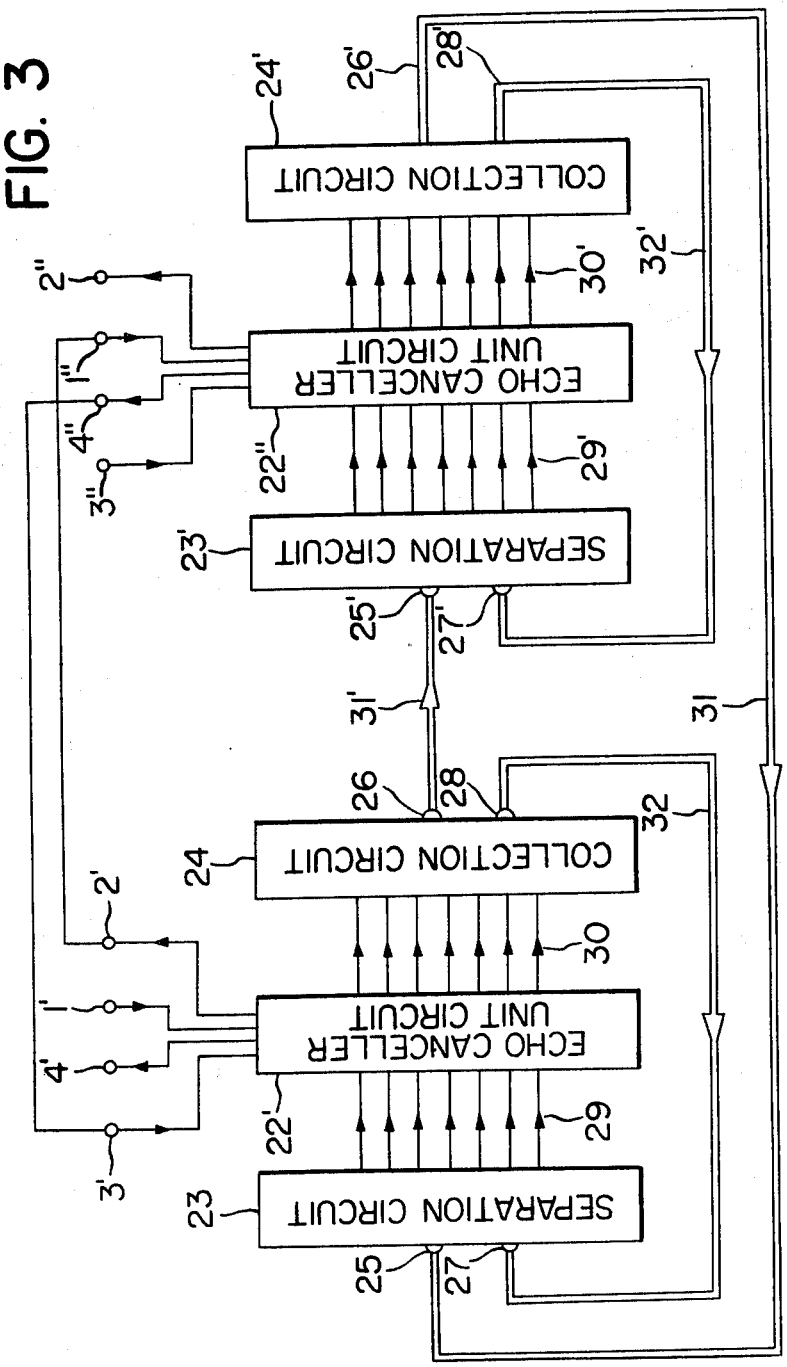
FIG. 3 is a block diagram of an echo canceller system in which a plurality of echo canceller unit circuits in accordance with the present invention are connected in cascade.

In FIG. 3 is shown a first embodiment of the present invention consisting of a number of m stages (two stages in FIG. 3) of echo cancellers as will be described in detail below. Reference numerals 1'-4' and 1''-4'' correspond to the input and output terminals 1-4 shown in FIG. 1. 22' and 22'' correspond to 22 in FIG. 1. 23 and 23' are data separation circuits for selecting desired data from the data bus; 24 and 24', collection circuits for collecting and transferring data; 25 and 25' and 26 and 26' are input and output terminals, respectively, of a first data bus for transmission of data to the next stage; 27, 27', 28 and 28' are input and output terminals, respectively, of a second data bus for transmission of data within one stage; 29 and 29' are data input lines for transmitting the outputs from the separation circuits 23 and 23' to the unit circuits 22' and 22'', respectively; 30 and 30' are data output lines for transmitting the outputs from the unit circuits 22' and 22'' to their corresponding collection circuits 24 and 24'', respectively; 31 and 31' are first data buses; and 32 and 32' are second data buses.

Of the data output derived from the unit circuit 22', the data which is needed in the arithmetic operation by the unit circuit 22' are returned from the output terminal 28 through the second data bus 32 to the input terminal 27. The data which is needed by the first unit circuit 22' for the arithmetic operation by the second unit circuit 22 are transmitted from the output terminal 26 through the first data bus 31' to the input terminal 25' of the second separation circuit 23'. The same is true for the data transmission from the second unit circuit 22''.

The first and second separation circuits 23 and 23' select the desired data from the spatially stored or time-division multiplexed data groups on the data bus. On the other hand, the collection circuits 24 and 24' deliver the spatially collected or time-division multiplexed data which are part of the outputs from the first and second unit circuits 22' and 22'' over the data buses from the output terminals 26, 26', 28 and 28'.

The output terminal 4'' is connected to the input terminal 3' and the terminal 2' is connected to the input terminal 1''. As described previously, the terminals 1', 2'', 3'' and 4' correspond to the terminals 1-4, respectively, shown in FIG. 1. Every receive path of the echo canceller must be directly connected to each other so that instead of connecting between the terminals 3' and 4'', the terminals 3'' and 4' can be interconnected to each other.

A plurality (two) of unit circuits 22' and 22'' are connected in cascade so that the data can be transmitted between them through the data buses. As a consequence, the circuit as shown in FIG. 3 can function as one echo canceller, as a whole, whose capacity is m-times as high as that of the echo canceller 22 as shown in FIG. 1.

Referring back to FIG. 1, the total delay which the delay circuit 5 provides is the product of the number of taps and the delay time (125 microseconds in the case of the telephone circuit) corresponding to the tap interval (the Nyquist interval). This total delay must be greater than the echo path delay which is the sum of (a) the transmission delay through the so-called echo path starting from the output terminal 4 through the telephone circuit 19, the converter 20 and the telephone circuit 19 again to the input terminal 1 and (b) the echo waveform dispersion time. The reason is as follows. The delay circuit 5 stores the past speech signal in order to provide the echo estimate. If the total delay that is, the storage capacity of the delay circuit 5 were not sufficient, the receive signal which is branched at the branch point 14 would pass through the delay circuit and would not stored in it at the time when the echo corresponding to the receive signal passing the branch point 14 and delayed through the echo path reaches the input terminal 1 to the send path. That is, the component needed for cancelling the echo has been lost. Therefore, if the echo canceller 22 must cancel out all the echoes transmitted through the echo path which are connected to the canceller 22, the number $(n+1)$ of taps must be provided so that the maximum possible delay can be handled. With the circuit as shown in FIG. 1, the echo canceller 22 must perform a tremendous amount of arithmetic operation with an increase in the number of taps. As a result, the processing speed of the operation must be high. Thus, arithmetic units which are very expensive must be used. The circuit becomes too large to be constructed with an LSI circuit. Furthermore, an excessive number of taps must be provided as compared with the echo path which is relatively short so that the fabrication costs would be unreasonably increased.

Referring back to FIG. 3, according to the present invention, the first and second unit circuits 22' and 22'' each have $(n+1)$ taps. If the cascade-connected unit circuits 22' and 22'' function as a single echo canceller, the required number of taps is $(2n+1)$. That is, if n is large, the number of taps is doubled. The interval processing speed of the unit circuits 22' and 22'' is equal to that of the echo canceller with $(n+1)$ taps and is not dependent upon the number m of cascades. Therefore, the above-described problems can be completely solved. The number of taps of the unit circuit is so determined that the unit circuit can handle a least demand. If the echo paths demand a large number of taps, the number of unit circuits connected in cascade is increased and vice versa. Thus, an optimum echo canceller can be provided for the demand of each telephone circuit upon the echo path delay to be accommodated.

FIG. 3 shows the m $(=2)$ stage unit circuits. When the input and output terminals 3'' and 2'' and the data bus 26' are connected to the third stage and those of the third stage are connected to the fourth stage and so on. An m-stage $(m \geq 3)$ echo canceller can be provided which functions as a single echo canceller.

The first embodiment of the present invention as shown in FIG. 3 has a further advantage. That is, all the unit circuits have the same structure as each other so that the present invention has not only the advantage that even if the processing speed of each unit circuit is comparatively low, the satisfactory echo cancellation can be accomplished, but also the advantage that the unit circuit can be mass produced and fundamentally is adapted to be fabricated in the form of an LSI.

In FIG. 3, the data bus 32 or 32' for recirculating data through a single unit circuit 22' or 22'' and the data bus 31 or 31' for transmitting the data from one stage to another are provided separately, but it is to be understood that the terminals 28 and 27' and the terminals 28' and 27 can be interconnected so that the former data bus 32 and 32' might be involved in the latter bus 31 and 31'. In this case, the recirculating data of a stage pass through the succeeding stages and are picked up by the separation circuit of the same stage again after circular transferring.

Figure 4:
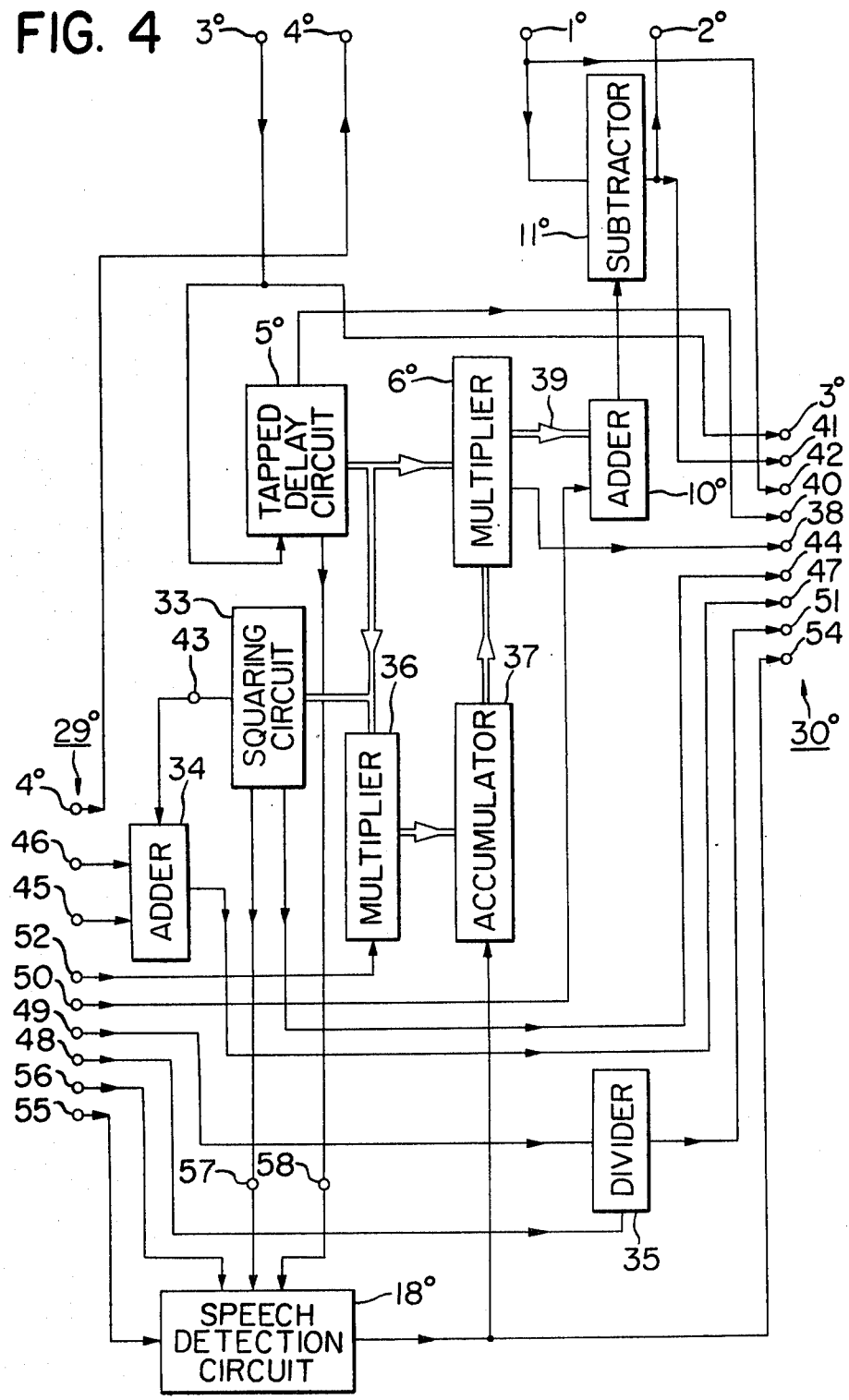
FIGS. 4, 5, 5a, and 5b are detailed circuit configurations, respectively, of the echo canceller unit circuit of the present invention.
Figure 5A:
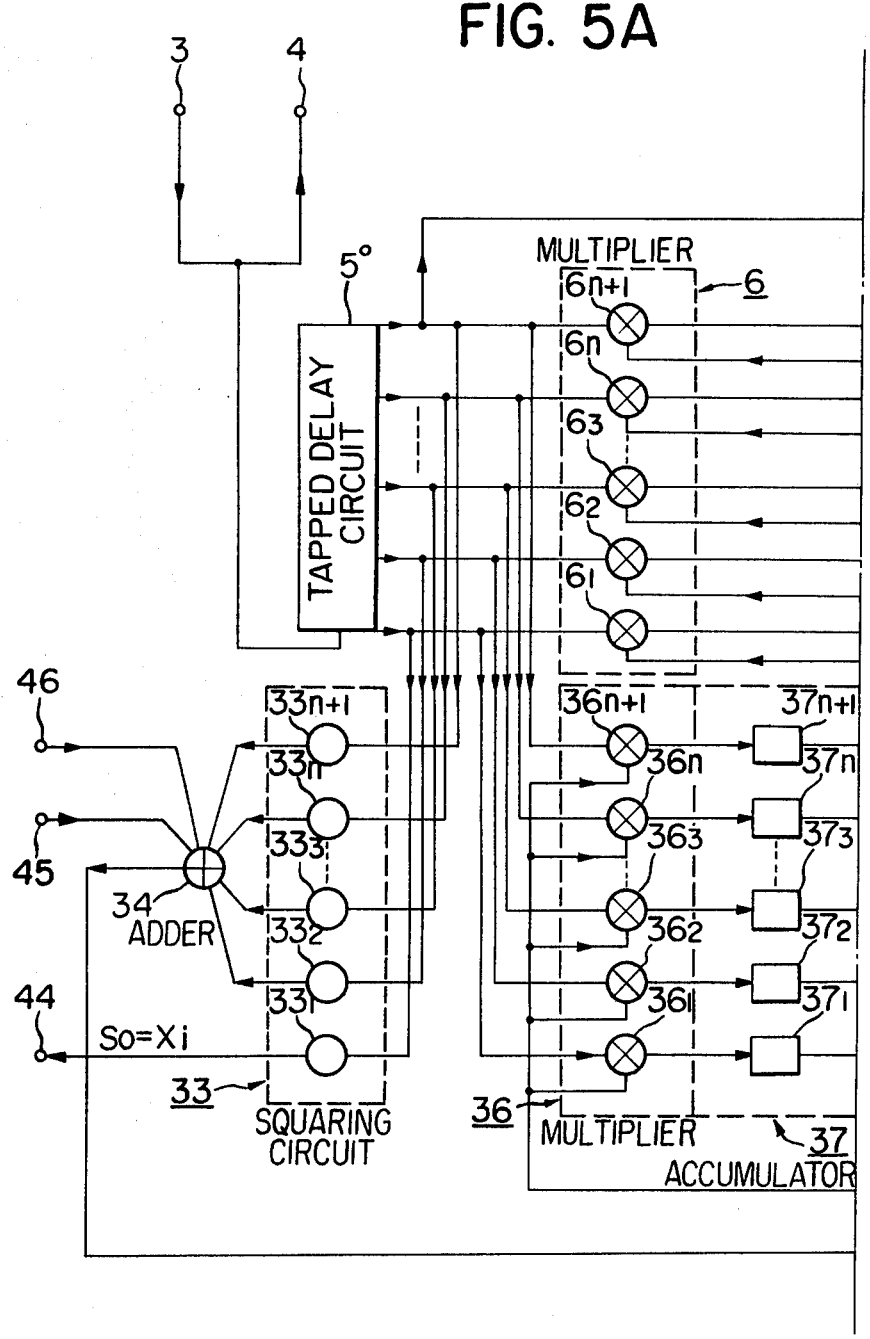
Figure 5B:
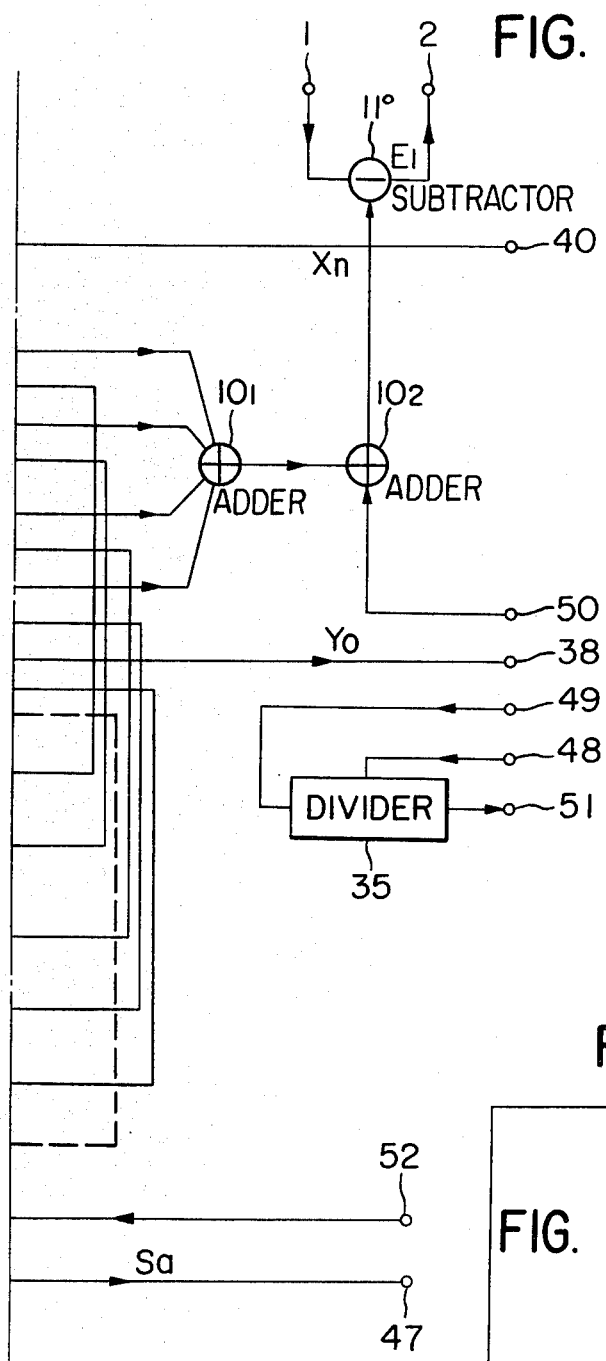
Figure 5:
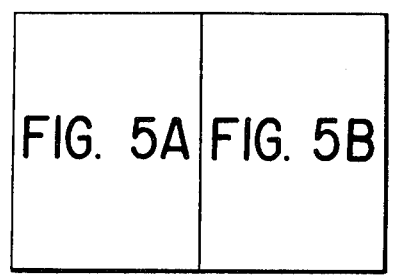

In FIGS. 4 and 5 the unit circuit 22' or 22" is shown in detail. The unit circuit as shown in FIG. 4 has the same function as the echo canceller 22 shown in FIG. 1. In addition, it is provided with data input and output terminals which correspond to those 29, 29', 30 and 30' shown in FIG. 3 so that the arithmetic operation process required for echo cancellation can be divided into the same structure processes and the (low processing speed) unit circuits can be connected in cascade. Therefore, the cascade connection of such unit circuits can bring effects and advantages which cannot be attained by the mere connection in cascade of the echo cancellers of the type as shown in FIG. 1.

Assume that the delay circuit 5 shown in FIG. 1 have a number of (n+1) taps and two echo cancellers 22 be connected in cascade, then the overall number of executive taps remains (n+1) so that the same effects of the cascade connected circuit as shown in FIG. 3 cannot be attained. Furthermore, the processed output from the send path of the first stage which hardly has co-relationship with the receive signal is applied to the input terminal to the send path of the second stage. Thus, the coefficient circuit in the second stage often cannot operate as to reduce the level of echo cancellation error to a minimum. Such problems can be eliminated by the circuit as shown in FIG. 4.

In FIG. 4, the input and output terminals 1°–4° correspond to those 1'–4' shown in FIG. 3; 29° and 30° are data input and output terminals corresponding to 29 and 30 in FIG. 3; 5° is a tapped delay circuit which corresponds to that indicated by 5 in FIG. 1; 6° is a multiplier which corresponds to those designated by 6-9 in FIG. 1; 10° corresponds to the adder 10; 11° corresponds to the subtractor 11; 18° corresponds to the speech detection circuit 18; 33 is a squaring circuit; 34 is an adder; 35 is a divider; 36 is a multiplier; and 37 is an accumulator.

More detailed interconnections of the unit circuit are shown in FIG. 5 in which the speech detection circuit 18 is abbreviated for convenience of description. As shown in FIG. 5, the output terminal 38 is connected to the multiplier 6 which in turn is connected to the first tap of the delay circuit 5°. The output terminal 40 is connected to the last tap of the delay circuit 5°. The output terminal 44 is connected to the squaring circuit 33 which in turn is connected to the first tap of the delay circuit 5°. The input terminals 45 and 46 are connected to the adder 34 which produces the sum of the outputs from the squaring circuits connected to the taps of the delay circuit 5 except at its first tap. The output terminal 47 is connected to the adder 34. The input terminals 48 and 49 are connected to the divider 35. The input terminal 50 is connected to the adder $10_2$. The output terminal 51 is connected to the divider 35. The input terminal 52 is connected to the multipliers $36_1$–$36_{n+1}$ which in turn are connected to the corresponding taps, respectively, of the delay circuit 5°. Thus, the desired data can be derived and delivered.

The receive signal $x_i$ ($i=0, 1, 2, \ldots$ and n) which appears at the input terminal 3 is stored in the delay circuit 5° and multiplied with the tap coefficients $h_j$ ($j=0, 1, 2, \ldots$ and n), which are stored in the accumulator 37, by the multiplier 6°. At the time point i, the following data $Y_o$ and $Y_1$ are delivered to the terminals 38 and 39 (FIG. 4), respectively.

$$Y_o = h_o x_i \tag{1}$$

$$Y_1 = \sum_{j=1}^{n} h_j x_{1-j} \tag{2}$$

In the case of the cascade connection, the outputs $X_n$ and $E_1$ which appear at the terminals 40 and 41 (FIG. 4), respectively, are given by $$X_n = x_{i-n} \tag{3}$$

$$E_1 = \begin{cases} y_1 - Y_o - Y_1 & \text{(from the first stage)} \\ y_1 - Y_1 & \text{(from the other stages)} \end{cases} \tag{4}$$

where $y_1$ is the input signal at the input terminal 1 and is delivered to the terminal 42 (FIG. 4).

$[x_i]$ is applied to the squaring circuit 33 and the following outputs $S_1$ and $S_o$ are delivered to the terminals 43 and 44, respectively.

$$S_1 = \sum_{j=1}^{n} x_{i-j}^2 \tag{5}$$

$$S_o = x_i^2 \tag{6}$$

Figure 6:
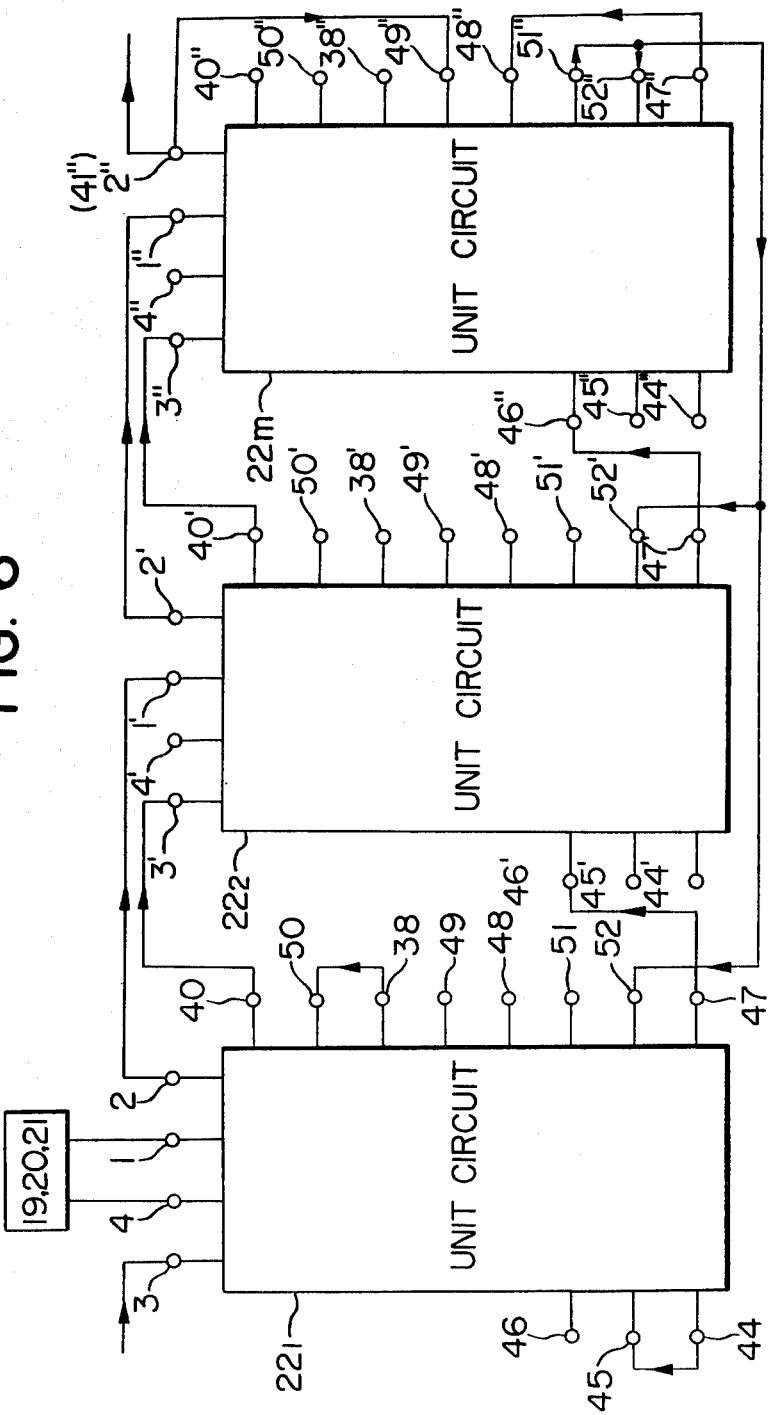
FIG. 6 shows an echo canceller system composed of such m (=3) unit circuits of the type as shown in FIG. 5 which are connected in cascade.

The unit circuits of the type as shown in FIGS. 4 and 5 can be connected in cascade as shown in FIG. 6. The terminal 3 of the first stage is connected to the terminal 4 of the last stage (not shown) and the terminals 40 of each stages are connected to the terminals 3, respectively, of the succeeding stages. The terminals 44 and 45 of the first stage are interconnected to each other. In other stages, the terminals 44 and 45 are open; that is, they are not connected. The terminal 46 of the first stage is open, but the terminals 46 of the other stages are connected to the terminals 47 of the preceding stages. The inputs to the terminals 43, 45 and 46 are added in the adder 34 and the sum is delivered to the terminal 47. When the number of m unit circuits are connected in cascade, the output Sa which appears at the terminal 47 of the last stage can be expressed by $$Sa = x_i^2 + \sum_{j=1}^{n} x_{i-j}^2 + \ldots + \sum_{j=(m-1)n+1}^{mn} x_{i-j}^2 = \sum_{j=0}^{mn} x_{i-j}^2 \tag{7}$$

the terminals 48 and 49 of a certain stage are connected to the terminals 47 and 41, respectively, of the last stage. The terminal 38 of the first stage is connected to the terminal 50 thereof, but the terminals 38 and 50 of the succeeding stages are disconnected from each other. The output Em which appears at the terminal 41" (or 2" in another expression) of the last stage is given by $$Em = y_{oi} - \{Y_o + Y_1 + \ldots + Y_m\} = y_{oi} - \sum_{j=0}^{mn} h_j x_{i-j} \tag{8}$$

where $y_{oi}$ is the input at the terminal 1° of the first stage.

Data Sa and Em are delivered to the terminals 48" and 49", respectively, and the divider 35 delivers to the terminal 54" the coefficient k $$k = \alpha \cdot Em/Sa \tag{9}$$

The coefficient is then delivered to the terminals 52, 52', 52" ... of all the stages in common. $\alpha$ is the gain of a negative feedback loop and k is the multiplication factor for tap coefficient corrections. The multiplier 36 delivers to the output terminal 53 of the l-th stage the following tap coefficient correction:

$$\Delta h_{l,j} = k_{i-j} \quad \begin{array}{l} j = 0, 1, \ldots \text{ and } n \text{ at the first stage;} \\ j = [(l-1)n+1], \ldots, [ln] \text{ at the other stages.} \end{array} \quad (10)$$

These factors are accumulated in the accumulator 37 and the corrected tap coefficients are delivered to the multiplier 6°. The tap coefficients are automatically adjusted in each stage and the echo in the output Em which appears at the terminal 2 of the last stage is attenuated.

The unit circuits are connected in cascade as described above, while the amount of arithmetic operation which can be accomplished within a time corresponding to one tap interval is constant. In each stage, the vector operations indicated by the broad or parallel lines in FIG. 4 are accomplished in parallel while the arithmetic operations indicated by the single lines in FIG. 4 are accomplished instantaneously. Therefore, when the number n of taps is suitably selected, a low speed processing in each arithmetic operation can be maintained. The total delay which the cascaded unit circuits can handle is equal to the time interval corresponding to (mn) taps. Therefore, when the number m is suitably selected depending upon an echo path which varies in distance, satisfactory echo cancellation can be achieved with the uniform unit circuits.

Referring back to FIG. 4, the speech detection circuit 18° is provided in every unit circuit connected in cascade. Its output is delivered to the accumulator 37. When the output is at the logical level "1", the accumulator 37 is disabled so that the correction of coefficients in response to the output from the multiplier 36 is temporarily suspended. When the output is "0", the correction of coefficient is resumed. The output from the speech detection circuit 18° is also delivered to the terminal 54 which is connected to the terminal of the succeeding stage except the last stage. The input terminal 56 is connected to the terminal corresponding to the terminal 42 of the first stage. The speech detection circuit 18° detects whether there exists the speech signal. The far end talker's echo which overlap on the near end talker's speech signal is a function of the receive signal so that the criteria for determining whether or not the speech signal is present is dependent upon the receive signal. The receive signal is delivered through the terminal 57 from the squaring circuit 33 or through the terminal 58 from the tapped delay circuit 5°. When the speech detection circuit 18° detects that there exists the speech signal in response to the inputs from the terminals 56 and 57 of the terminals 56 and 58, the logical level "1" is multiplied with the input to the terminal 55 and delivered as the output from the speech detection circuit 18°. When the input is delivered through the terminal 57 to the speech detection circuit 18°, the integration detection is available but when it is applied through the terminal 58, the instantaneous detection is available for detecting the speech signal.

As for the input terminal group 29° and the output terminal group 30°, in FIG. 4, the terminals 4°°, 46, 48, 49, 52, 55 and 56 correspond to the terminal 25 shown in FIG. 3; the terminals 45 and 50, to the terminal 27, 3°°, 40, 41, 42, 47, 51 and 54, to 26; and 38 and 44, to 28.

In FIG. 7 is shown in detail the separation circuit 23 or 23' (See FIG. 3). It has gate circuits 76–81 for separating the desired data from the data groups which are applied to the input terminal 25 and are multiplexed by time sharing technique and gate circuits 82 and 83 for separating the desired data from the data groups which are applied to the input terminal 27 and are also multiplexed by time sharing technique. Each gate circuit is opened to pass the desired data for the same time interval as the data interval in response to the gate pulse applied to the input terminal 84, 85, 86, 87, 88, 89, 90 or 91. The data which have passed the gate circuit are delivered to the output terminal 46, 52, 49, 48, 56, 55, 45 or 50 (which corresponds to the same numeral terminal as shown in FIG. 4).

The circuit as shown in FIG. 7 employs the space division technique for delivering the desired data from the data bus to the two input terminals, respectively, and the time-division technique for separating the time-division multiplexed data groups is applied to each input terminal. Further, it is to be understood that only one input terminal can be used and the gate circuits equal in number to the output terminals which can be employed so that only a time-division interface circuit is used.

The mode of operation of the separation circuit 23 will be described with reference to FIG. 8 in which the signals which appear at the terminals 25, 84 and 46 are plotted along the time axis t. The time-division multiplexed data 92 are applied to the input terminal 25 of the gate circuit 76 and the gate pulse 93 is applied to the terminal 84 for a predetermined time slot so that the desired data 94 are separated and appear at the output terminal 46. The other gate circuits 77–83 operate in a manner substantially similar to that described above.

Figure 9:
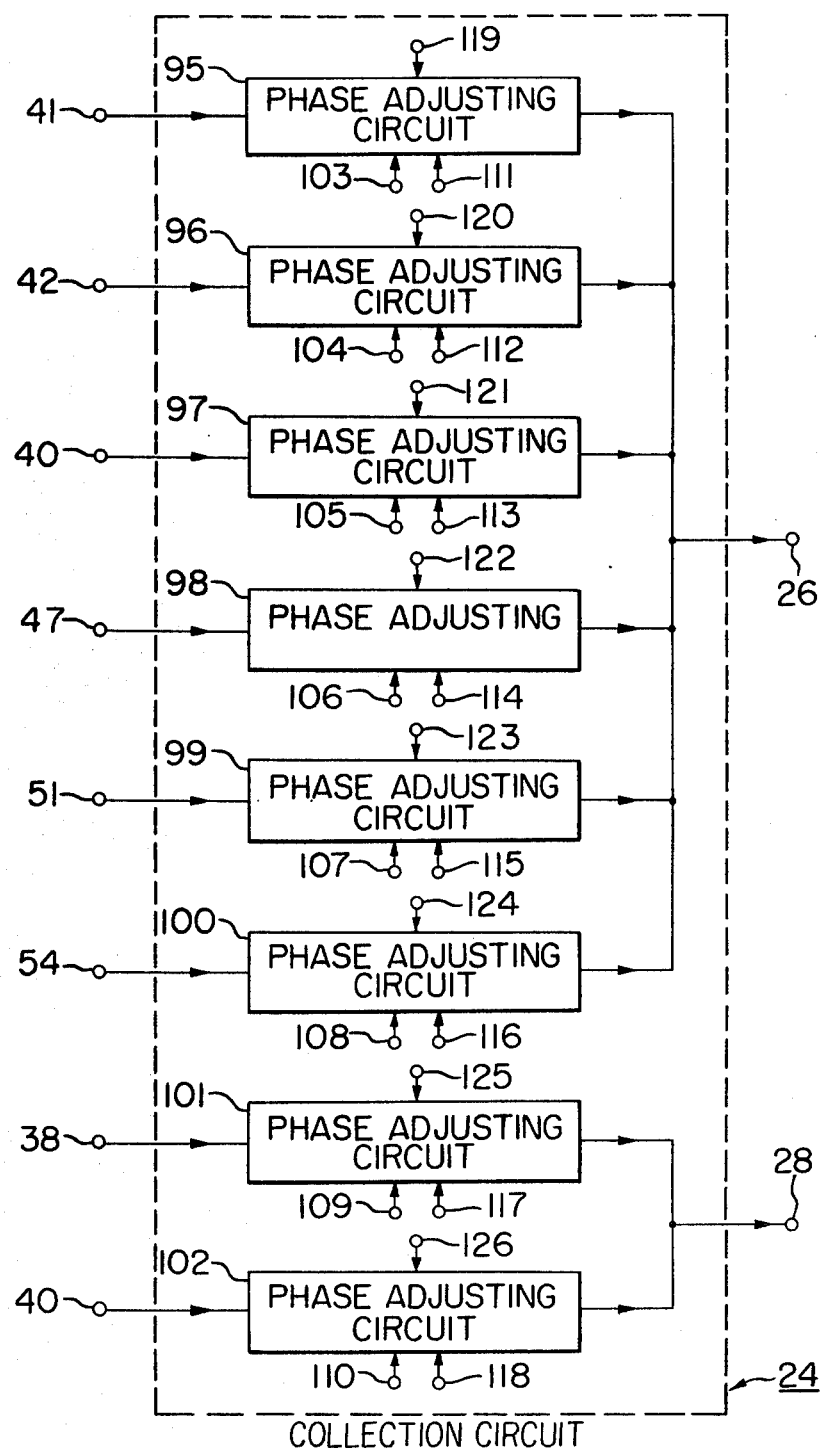
FIG. 9 is a diagram of a data collection circuit.

In FIG. 9 is shown in detail the data collection circuit 24 or 24' (See FIG. 3). It has phase adjusting circuits 95–100 which insert the data applied to the input terminals 41, 42, 40, 47, 51 and 54 (which correspond to the output terminals designated by the same reference numerals in FIG. 4) into each predetermined time slot along the time axis at the output terminal 26. It further has phase adjusting circuits 101 and 102 each of which is adapted to determine the timing by which the data applied to the input terminal 38 or 40 is multiplexed and transmitted to the output terminal 28 by the same time sharing technique as above.

The phase adjusting circuits 95–102 have read-in pulse input terminals 103–110, respectively, and in response to the read pulse applied to every read-in pulse input terminal, the corresponding phase adjusting circuit reads the data applied to its input terminal. They have also read-out pulse input terminals 111–118, respectively, and in response to the read-out pulses arranged by the time sharing technique, the contents in the phase adjusting circuits 95–102 are read out within each predetermined time and delivered to the output terminal 26 or 28. The phase adjusting circuits 95–102 further have clock pulse input terminals 119–126, respectively, to which are applied common clock pulses.

The data which have arrived at a given time are adjusted in phase by the corresponding phase adjusting circuit and delivered so as to be inserted into a predetermined time slot along the time axis so that the data groups can be transmitted on the data bus without being overlapped upon each other.

In FIG. 10, the mode of operation of the data collection circuit 24 will be further described in detail with reference to the figure. The data 127, 128 and 129 which are the results of the arithmetic operation executed by the unit circuit 22′ or 22″, appear at the input terminals 41, 42 and 40, respectively, and are displaced from their allocated time slots on the time axis at first. The clock pulses 130 as shown at 119 are applied to all the clock pulse input terminals 119–126 as described previously. Each time interval during which the read-in pulse 131, 132 or 133 is applied to the input terminal 103, 104 or 105 is synchronized with the corresponding time intervals during which the corresponding data 127, 128 or 129 appears at the data input terminal 41, 42 or 40. The read-out pulse 134, 135 or 136 which is applied to the read-out pulse input terminal 111, 112 or 113 is synchronized with each time slot prearranged for the corresponding data 127, 128 or 129, respectively. Therefore, the input data 127, 128 and 129 are correctly inserted into their allocated time slots and appear at the output terminal 26 in the order of 137, 138 and 139.

Referring still FIG. 10, the mode of operation will be described in more detail in conjunction with the data 128. The data 128 are applied to the input terminal 42 and temporarily stored in the phase adjusting circuit 96 in response to the read-in pulses 132 applied to the input terminal 104. Thereafter, the logic product of the read-out pulse 135 applied to the terminal 112 and the clock pulses 130 applied to the terminal 120 determines a read-out time interval during which the stored data are read out from the phase adjusting circuit 96 and delivered to the output terminal 26. The other phase adjusting circuits operate in a manner substantially similar to that described above. As a result, the input data are sequentially inserted into their allocated time slots and appear at the output terminal 26 or 28 in a predetermined sequence in time as indicated by 137, 138 and 139. Thus, the input data 127, 128 and 129 are rearranged or collected in a time-division manner.

In FIG. 11 is shown in detail the speech detection circuit 18° (See FIG. 4). The speech detection circuit 18° generates the control signal "0" when the send signal at the input terminal 1° in FIG. 4 does not have sufficient power to estimate that the far end talker's echo is dominant over the send signal inserted into the input terminal 56, compared with the sum of the squared tap outputs which is derived from the tapped delay circuit 5° and obtained by the squaring circuit 33, namely the receive signal level within the time window accommodated by the delay circuit 5°, after the receive signal is detected at the input terminal 57. On the contrary, the speech detection circuit 18° generates the control signal "1" when the send signal has sufficient power so the far end talker's echo cannot be estimated to be dominant over the send signal.

The call detection circuit 18° has a power detection circuit 59 which detects the send signal level. For instance, the sum of the squared send signals within the same time window as above, or the integral value of the absolute or squared send signal obtained with the integration circuit of the integration time constant corresponding to the time window; a timing circuit 60 for temporarily storing the input signal applied to the input terminal 57 until the result of the arithmetic operation is derived from the power detection circuit 59; a comparator 61 which compares the output from the timing circuit 60 with the output from the power detection circuit 59 and generates the output "0" when the output from the power detection circuit 59 is lower in level than the output from the timing circuit 60, while generates the output "1" when the former is higher than the latter; a control circuit 62 which delivers the output "1" when the accumulated value of the output from the comparator 61 which is accumulated within a predetermined time interval or the integral value of the output from the comparator 61 under a certain integration time constant is equal to or higher than a predetermined value, but delivers the output "0" when the accumulated output or the integrated value is less than a predetermined level; and a logic circuit 63 which produces the logic product of the output from the control circuit 62 and the input applied to the input terminal 55. It delivers the output "1" except the time when one or some of the cascade-connected unit circuits are delivering the control signal "0". The output signal "1" is delivered to the accumulators 37 in all the stages or unit circuits so that the coefficient correction operation by each weighted coefficient correction circuit 17 (See FIG. 1) can be suspended. Otherwise, the logic circuit 63 delivers the output "0" so that the coefficient correction operations in all the stages or unit circuits can be resumed.

So far, the speech detection circuit 18° has been described as detecting the receive signal from the input terminal 57. But it is to be understood that it can detect the receive signal from the input terminal 58 (See FIG. 4) because this signal exactly represents the input signal to the squaring circuit 33. In the latter case, instead of the timing circuit 60, a circuit which is substantially similar in structure and mode of operation to the power detection circuit 59 must be used. In this case, instead of the integration detection described above, a system for detecting an instantaneous peak can be employed. To this end, the power detection circuit 59 and timing circuit 60 shown in FIG. 11 are replaced by the peak detection circuits which can detect each peak value of the inputs during a time interval equal to the total time delay provided by the delay circuit 5°, respectively.

In FIG. 12 is shown another embodiment of the speech detection circuit 18°. It is provided for every cascade-connected stage or unit circuit as the speech detection circuit shown in FIG. 11. But the former is different from the latter in that within the whole cascade-connected stages or unit circuits, the operation for detecting whether or not there is present the speech signal from the near end customer by detecting whether or not the echo from the far end customer is dominant over the send signal is carried out only once.

The speech detection circuit 18° has a power detection circuit (or a peak detection circuit) 64 which is adapted to detect the power or peak value of the send signal; a timing or power detection circuit (or peak value detecting circuit) 65 for detecting the power or the peak value of the receive signal; a separation circuit 66 which separates, for the purpose of the detection of the speech signal, the sum or maximum value of the outputs from the circuits 64 and 65 in the other unit circuits from the control output signal and level detection circuits 67 and 68. The first level detection circuit 67 generates the sum or maximum value of the output from the power detection circuit 64 and the separated output from the separation circuit 66 which corresponds to the output from the circuit 64. In like manner, the second level detection circuit 68 generates the sum or maximum value of the output from the circuit 65 and the output from the circuit 66 which corresponds to the output from the circuit 65.

The speech detection circuit 18° further includes a comparator 61′ (which corresponds to that indicated by 61 in FIG. 11); a control circuit 62′ (which corresponds to the one designated by 62 in FIG. 11); a control output signal insertion circuit 69 which is adapted to deliver the control signal generated by the control circuit 62′ in every stage or unit circuit to all the stages or unit circuits in a space or time-division manner; a collection circuit 70 for collecting the outputs from the first and second level detection circuits 67 and 68 and the control signal insertion circuit 69; and a branch point 71 for delivering the control signal to the accumulator 37 (See FIG. 4).

The speech detection operation by the comparator 61′ and the control circuit 62′ is carried out only in one stage (for instance, the last stage) which incorporates the outputs of the power detection circuits 64 and 65 in every stage. The control signal is delivered through the insertion circuit 69 to the data bus and distributed to all the stages. The outputs from the first and second level detection circuits 67 and 68 are also transmitted through the collection circuit 70 to the data bus to be incorporated in the above stage.

The mode of operation of the speech detection circuit described above with reference to FIG. 12 is substantially similar to that of the speech detection circuit 18° described previously with reference to FIG. 4.

Figure 13A:
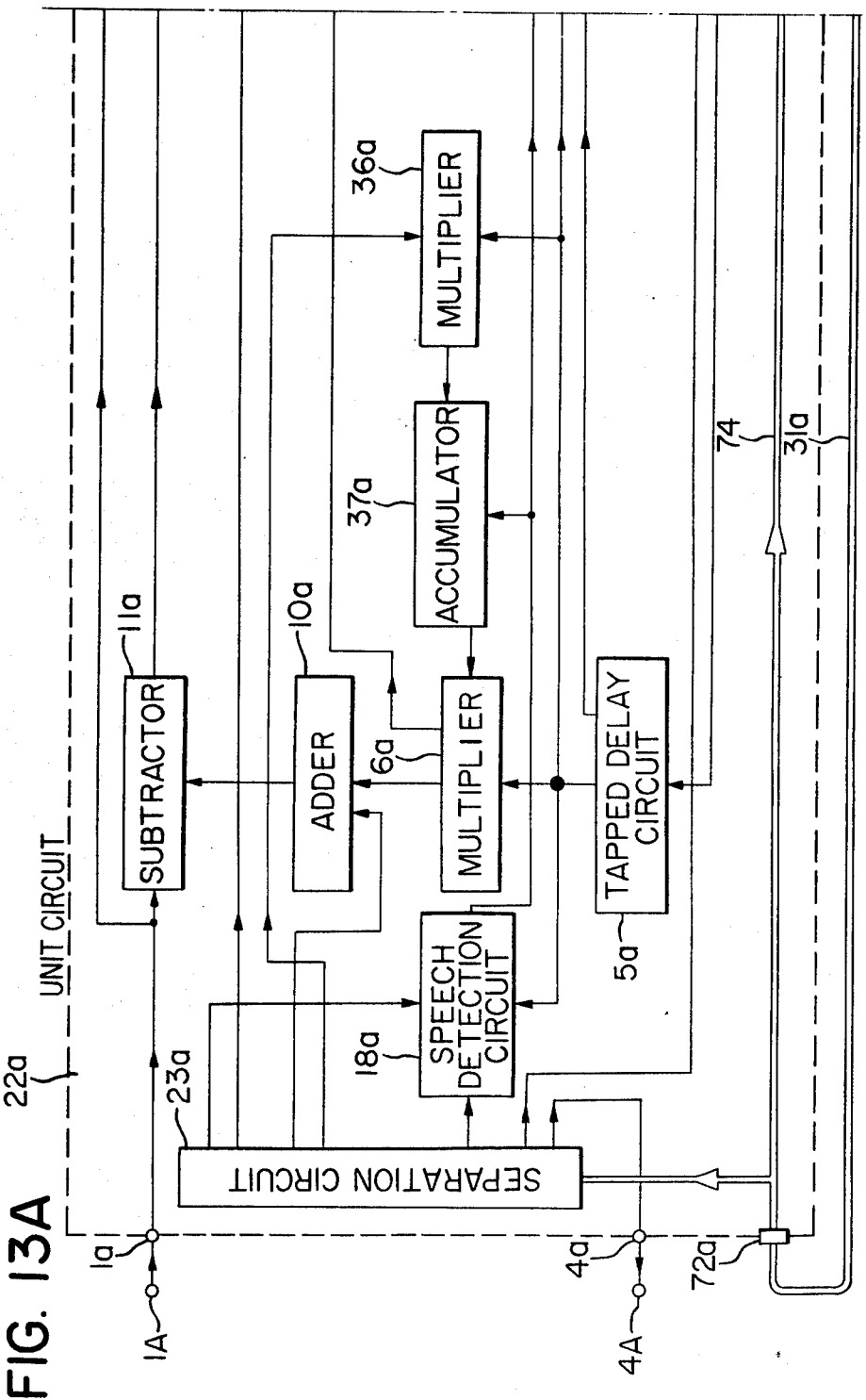

Second Embodiment, FIG. 13

In FIG. 13 is shown a second embodiment of the present invention in which all the stages or unit circuits are connected through their separation and collection circuits to a single data bus which forms a closed loop. The echo cancellation device is shown as consisting of three stages (m=3), but it is understood that the number of stages or unit circuits can be increased or decreased as needs demand.

22a, 22b and 22c designate unit circuits each including a separation circuit and a collection circuit. 1a, 2a, 3a and 4a; 1b, 2b, 3b and 4b; and 1c, 2c, 3c and 4c correspond to the terminals 1°, 2°, 3° and 4°, respectively, as shown in FIG. 4. 1A, 2A, 3A and 4A correspond to the terminals 1, 2, 3 and 4, respectively, as shown in FIG. 1. 31a, 31b and 31c are data buses. 72a, 73a; 72b and 73b; and 72c and 73c are input and output terminals of the data buses 31a-31c, 1 respectively. 74 is a data bus interconnecting among the unit circuits 22a-22c. 23a and 24a correspond to the separation and collection circuits 23 and 24, respectively, as shown in FIG. 3.

In the first stage or unit circuit 22a, circuits 5a, 6a, 10a, 11a, 18a, 36a and 37a correspond to the circuits 5°, 6°, 10°, 11°, 18°, 36 and 37, respectively, as shown in FIG. 4. They are interconnected and operate in a manner substantially similar to that described with reference to FIG. 3 or 4.

A multiplication factor circuit 75a generates a common multiplication factor to be multiplied with the tap coefficient corrections derived from the circuit 36a; that is, the coefficient k derived from Eq. (9). Its function is the combination of those of the squaring circuit 33, the adder 34 and the divider 35 shown in FIG. 4.

The first, second and last units 22a, 22b and 22c are four-terminal pair networks. For the sake of clear illustration of the cascade connection of these circuits 22a-22c, the send signal is applied to the first unit circuit 22a while the receive signal, to the last unit circuit 22c. The echo from the far end customer is subtracted from the send signal applied to the terminal 1A by the unit circuits 22a-22c and is cancelled out at the terminal 2A. The received signal which appears at the terminal 3A is distributed to the arithmetic units in the three stages 22a-22c through their tapped delay circuits. In general, the increase in delay is not permitted between the input terminal 3A and the output terminal 4A. Therefore, the receive signal applied to the last unit circuit 22c is transmitted through the delay circuit 5a and the collection circuit 24a thereof, the terminal 73c, the data bus 31a, the terminal 72a and the separation circuit 23a in the first unit circuit 22a to the output terminal 4A. Thus, the signal which appears at the terminal 4A is the same as at the terminal 3A. In addition, the subtractions executed by every subtractor 11a in the unit circuits 22a-22c are not sequenced. As a result, the send signal can be transmitted not only in the sequence of 1a, 2a, 1b, 2b, 1c and 2c but also in the sequence of 1b, 2b, 1c, 2c, 1a and 1b or 1c, 2c, 1a, 2a, 1b and 2b. In like manner, the receive signal can be transmitted in the sequence of 3c, 73c, 72c, 4c, 3b, 73b, 31c, 31a, 72a, 4b, 3a and 5a or 3c, 73c, 72a and 4a. Furthermore, the receive signal can be applied to the intermediate terminals 3b and 3a as in the case of the send signal and the receive signal can be derived toward the near end customer from the terminal corresponding to 4A in the other stage.

The first unit circuit 22a executes the arithmetic operation expressed by Eq. (8); that is, $$y_{oi} - (Y_o + Y_1);$$

the second unit circuit 22b, $$y_{oi} - (Y_o + Y_1 + Y_2); \text{ and}$$

the third or last unit circuit 22c, $$y_{oi} - (Y_o + Y_1 + Y_2 + Y_3)$$

The output Em (m=3) is derived from the output terminal 2A.

The delay circuit 5a stores the receive signal $\{x_i\}$. That is, in response to the external pulses, the delay circuit 5a reads in and out the receive signal. The multiplier 6a executes the convolution; that is, $h_j x_{i-j}$ as expressed in Eq. (1) or (2). The adder 10a summs up the results derived from the multiplier 6a. The subtractor 11a executes the subtraction expressed in Eq. (8). The multiplier 36a executes the arithmetic operation of the tap coefficient corrections expressed by Eq. (10). The accumulator 37a corrects the tap coefficients and stores them. The multiplication factor circuit 75a executes the operation as expressed by Eq. (9).

These operations will be described in more detail with the reference to the timing chart shown in FIG. 14. Regardless of the number of cascaded unit circuits, the amount of operation executed by each unit circuit is constant and the processing speed of the operation is low. The input signals applied to the input terminals 1A and 3A (See FIG. 13) must be digital quantities. In FIG. 14, C refers to the arithmetic operation; I, the input (that is, separation); and T, the transfer (collection). i refers to the i-th time point and To, one sampling interval (which is equal to a Nyquist interval of, for instance, 125 microseconds). Reference numerals 5a-18a; 5b-18b and 5c-18c in the column indicate the circuits shown in FIG. 13. During the time intervals indicated by the solid straight lines, the arithmetic operations C, data inputs I and data transfers T are carried out. In each unit circuit, time is almost used to execute the operations associated with the delay circuit 5a and the time chart remains unchanged regardless of the number of cascade connected unit circuits. Such advantages can be obtained only because the required various arithmetic processes are uniformly divided into each stage unit circuit.

Figure 15:
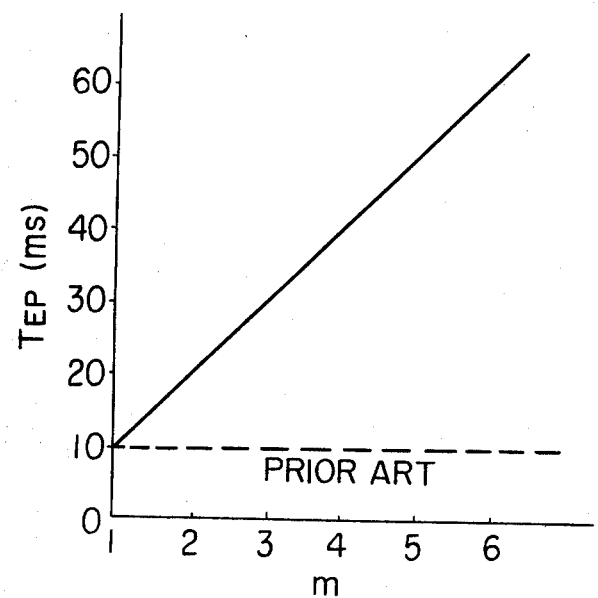
FIGS. 15 and 16 are views used to explain the effects attained by the echo canceller system in accordance with the present invention.

FIG. 15 shows the relationship between the number of unit circuits m and the maximum echo path delay $T_{EP}$ accommodated by the experimental echo canceller in accordance with the present invention, when the delay circuit 5 has 81 taps (n=80); the frequency range is from 0.3 to 3.4 KHz; and the sampling frequency is 8 KHz. The clock frequency which is about 1 MHz remains unchanged regardless of the number of unit circuits m.

Assume, for instance, that an echo cancellation device capable of accommodating the maximum echo path delay $T_{EP}$=mn To=400 To=50 ms (where m is 5) is needed. According to the prior art, the number of the processing elements must be increased by five times or the processing speed of the operations must be increased by five times. In case of $T_{EP}$=n To, about 10 kilo gates are needed. Therefore, the installation of the processing elements in case of $T_{EP}$=mn To=50 ms in one LSI chip is not feasible with the present stage of LSI techniques providing only 10–20 kilo gates per chip. However, according to the present invention, regardless of the maximum echo path delay to be accommodated, every unit circuit can be made small in fabrication and a low processing speed can be maintained. As a consequence, the echo cancellation device in accordance with the present invention can be easily fabricated in the form of LSI. Suppose that VLSI techniques an improved so that tens kilo gates (for instance, 50 kilo gates) can be formed on one chip, then, according to the present invention, a greater maximum echo-path delay $T_{EP}$ can be accommodated with such extremely large scale chip unit circuits. Thus, the present invention provides a novel echo canceller system which finds wide and various applications.

Figure 16:
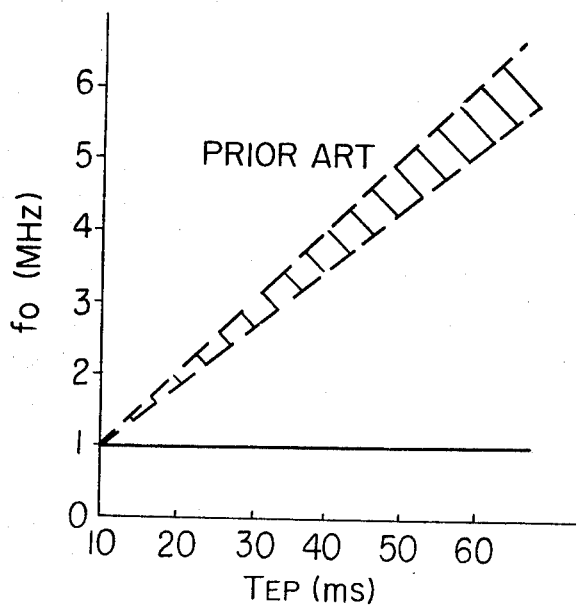

As shown in FIG. 16, according to the present invention, even when the maximum echo path delay $T_{EP}$ is increased, the clock frequency $f_o$ for the internal arithmetic processing can be maintained constant. On the other hand, according to the prior art technique, the clock frequency $f_o$ must be increased with increase in $T_{EP}$ and varies within a certain region because a time required for executing arithmetic operations common to all the unit circuits can be reduced depending upon the arithmetic procedure which is employed. If attempts are made to reduce the circuit of the prior art echo canceller by utilizing the time sharing technique or the like, the clock frequency must be increased beyond $f_o$ shown in FIG. 16 in proportion to the degree of time-division multiplexing. The reason why according to the present invention the clock frequency can be maintained at a relatively lower value is as follows. Almost all the arithmetic operations can be executed in parallel in every unit circuit connected in cascade and the results of each operations are temporarily and individually stored in the buffer memories or the like. Thereafter, the unit circuits are so synchronized that all the data can be simultaneously transferred among them.

Figure 17:
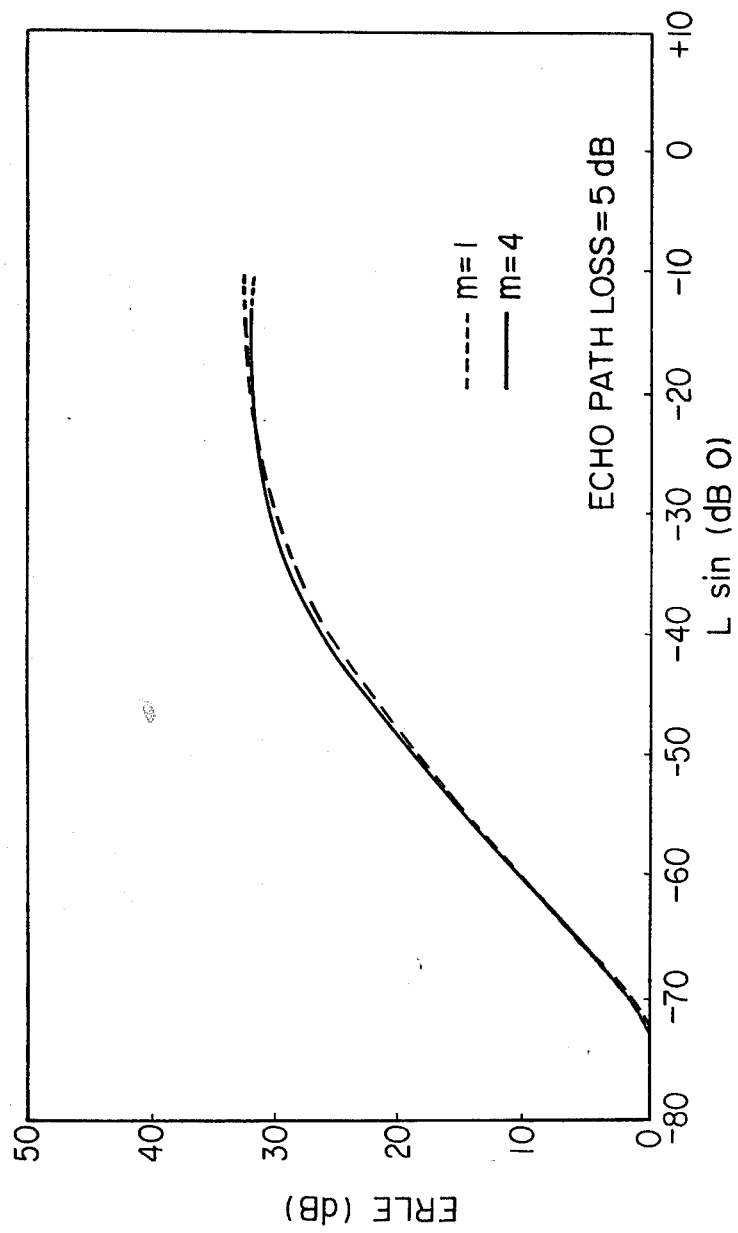
FIG. 17 shows the relationship between the echo return loss enhancement (ERLE) and the level (Lsin) of the echo reaching from the far end customer to the input terminal to the send path.

FIG. 17 shows the relationship between the echo return loss enhancement (ERLE) and the level (Lsin) of the echo reaching from the far end customer to the input terminal to the send path. The data were obtained from the tests conducted with the echo canceller system of the type described previously. The transmission lines used in the tests were so designed and constructed that the echo paths were substantially similar to those present in practice in Japan. They included one link of digital transmission section (with the μ-law, 15 segments, μ=255, 8-bit coded, 64 kb/s/channel). Regardless of the number of cascaded unit circuits (m=1 or 4 in FIG. 16), the ERLE remains almost unchanged and is free from degradation. It is seen that the saturations of ERLE reaches as high as about 32 dB which is by far higher than the past world record of about 27 dB. The reason why such high ERLE can be attained is as follows. The unit circuits can be sufficiently reduced in processing amount and part of the margin under the processing amount limit thus obtained can be used for increasing the word length used in arithmetic operation. As a result, accuracy in arithmetic operation can be remarkably improved.

The effects, features and advantages of the present invention may be summarized as follows:

(1) Since the unit circuits are connected in cascade, the maximum echo path delay which can be accommodated can be increased. When a number of m unit circuits are connected in cascade, the whole system can handle the echo path delay which is m-times the delay which each unit circuit can accommodate.

(2) Regardless of the number of cascaded unit circuits, the processing speed of the operations can be maintained low in each unit circuit. Therefore, the echo canceller system of the present invention can be easily fabricated.

(3) Because of the above-mentioned features, the present invention can provide an echo canceller system which is well suited to the LSI fabrication. The reasons are as follows:

(a) The unit circuits of the uniform structure are used so that they are adapted for mass production. As a result, high efficiency production can be achieved so that costs can be reduced and a higher degree of reliability in operation can be ensured.

(b) Various kinds of echo canceller systems for wide use from voice signal transmission equipments of the comparatively short maximum echo path delay and satellite or international communication systems of the comparatively long maximum echo path delay, to howling or accoustic feedback preventive systems of the extremely long maximum echo path delay can be provided by suitably selecting the maximum echo path delay accommodated with the unit circuit and the number m of unit circuits connected in cascade.

(c) Since the processing speed of the operation in each unit circuit is low, the design of LSI systems can be greatly facilitated. As a consequence, LSI systems become feasible with less risk.

What is claimed is:

1. An echo canceller unit circuit for combining an inverted echo estimate signal derived from a receive signal with a send signal, said circuit comprising:
   a delay circuit having a plurality of taps and an input terminal for connection to a receive path for processing a receive signal thereon, said receive signal having an echo estimate portion;
   said taps providing output signals delayed by successively increasing intervals with respect to the receive signal applied to said delay circuit, and comprising a first tap having the least delay and a last tap having the greatest delay;
   a plurality of multipliers, each multiplier weighting the output from a corresponding one of said taps;

an adder for summing the outputs from said multipliers;

a subtractor for reversing the polarity of the output signal from said adder and adding the reversed polarity output signal to a send path;

a weighting coefficient correction circuit having an input terminal connected to said receive path and a plurality of output terminals connected to respective ones of said multipliers, for adjusting the weighting coefficients applied to said multipliers in such a way that the receive signal applied to said delay circuit and the output signal from said subtractor substantially have no correlation with each other;

a multiplication factor circuit coupled to said weighting coefficient correction circuit for generating a multiplication factor and multiplying said factor by the weighting coefficient of each of said multipliers;

a speech detection circuit responsive to a speech level above a predetermined threshold value for inhibiting the weighting coefficient correction by said weighting coefficient correction circuit;

output terminals for delivery an output from said delay circuit, an output from each of said multipliers, the output from said multiplication factor circuit, and the output from said subtractor; and input terminals for receiving the receive signal, an input to said adder, an input to said multiplication factor circuit and an input to said weighting coefficient correction circuit.

2. An echo canceller unit circuit as set forth in claim 1, wherein said multiplication factor circuit includes a divider, a squaring circuit, and a squaring-adder circuit and said weighting coefficient correction circuit includes a multiplier, further characterized in that said output terminals comprise:

a first output terminal (40) connected to the last tap of said delay circuit, a second output terminal (38) for deriving the output signal from that one of said plurality of multipliers which is connected to the first tap of said delay circuit, a third output terminal (51) for deriving the output signal from the divider in said multiplication factor circuit, a fourth output terminal (44) for deriving the output signal from the squaring circuit ($33_1$) in said multiplication factor circuit, said squaring circuit generating the square of the output signal derived from the first tap of said delay circuit and a fifth output terminal (47) for deriving the output signal from the squaring-adder circuit in said multiplication factor circuit, said squaring-adder circuit generating the sum of the squares of the outputs derived from the taps except said first tap of said delay circuit and means for applying the output signal from said divider to a multiplier in said weight coefficient correction circuit.

3. An echo canceller unit circuit responsive to a receive signal and comprising:

a delay circuit with a plurality of taps, a plurality of multipliers each for weighting the output from each of said taps, an adder for summing up the outputs from said multipliers, a subtractor for reversing the polarity of the output from said adder and adding the reversed polarity output to a send signal from a send path, a weighting coefficient correction circuit for correcting the weighting coefficients applied to said multipliers in such a way that the receive signal applied to said delay circuit and the output signal from said subtractor substantially have no correlation with each other, a multiplication factor circuit which generates a multiplication factor which in turn is multiplied with the weighting coefficient correction of said multipliers, and a speech detection circuit which receives the send and receive signals and detects whether or not the speech signal from a near end customer exists in the send signal so that except in the case when the echo from a far end customer is detected as being dominant in the send signal, said speech detection circuit inhibits the weighting coefficient correction by said weighting coefficient correction circuit, whereby the near end talker's speech signal is permitted to pass through said subtractor, but the echo is cancelled by the output from said adder in said subtractor, characterized by the provision of a collection circuit for collecting, in at least a time-division manner an output from said delay circuit, an output from each of said multipliers, the output from said subtractor and the output from said multiplication factor circuit; and a separation circuit which separates from the output from said collection circuit or similar circuit thereof the output to a receive signal output terminal, an input to said adder, an input to said multiplication factor circuit and an input to said weighting coefficient correction circuit.

4. An echo canceller unit circuit as set forth in claim 3 further characterized in that said collection circuit is provided with a plurality of phase adjusting circuits coupled to an output from said delay circuit, an output from each of said multipliers, the output from said subtractor and the output from said multiplication factor circuit for inserting data to be transferred into predetermined time slots, respectively.

5. An echo canceller unit circuit as set forth in claim 3 further characterized in that said separation circuit is provided with a plurality of gate circuits for passing and selecting the desired incoming data within a pedetermined time slot.

6. An echo canceller system characterized in that said system comprises a plurality of echo canceller unit circuits as set forth in claim 3; and each of said plurality of echo canceller unit circuits further comprises a bus input terminal and a bus output terminal which are respectively connected to a separation circuit and a collection circuit thereof, and a unidirectional data bus which is connected between said bus input terminal and said bus output terminal thereof, said plurality of echo canceller unit circuits are connected in cascade by connecting said bus output terminal of said each of said plurality of echo canceller unit circuits with said bus input terminal of a next one of said plurality of echo canceller unit circuits, and said bus output terminal of a last one of said plurality of echo canceller unit circuits is connected to said bus input terminal of a first one of said plurality of echo canceller unit circuits.

* * * * *